United States Patent [19]
Okada et al.

[11] Patent Number: 6,083,606
[45] Date of Patent: Jul. 4, 2000

[54] LAPPING TAPE

[75] Inventors: Kesao Okada; Shigeo Kurose, both of Saku, Japan

[73] Assignee: TDK Corporation, Tokyo, Japan

[21] Appl. No.: 09/064,777

[22] Filed: Apr. 23, 1998

[30]     Foreign Application Priority Data

Apr. 25, 1997 [JP] Japan ..................................... 9-123199

[51] Int. Cl.⁷ ..................................................... B32B 3/00
[52] U.S. Cl. ........................... 428/147; 428/143; 428/149; 428/144
[58] Field of Search ..................................... 428/147, 149, 428/143, 144

[56]                    References Cited

U.S. PATENT DOCUMENTS 5,271,964   12/1993   Ohishi .

FOREIGN PATENT DOCUMENTS 5-192869   8/1993   Japan .
5-192870   8/1993   Japan .

*Primary Examiner*—Christopher Raimund
*Attorney, Agent, or Firm*—Obon, Spivak, McClelland, Maier & Neustadt, P.C.

[57]            ABSTRACT

Described is a lapping tape having, on a flexible substrate, a lapping layer comprising inorganic powders and a binder as main components. The binder contained in the lapping layer comprises:

1) a phenoxy resin; and 2) a polyester polyurethane resin having a number-average molecular weight Mn not less than 20000 but not greater than 100000. Accordingly, the lapping tape so obtained exhibits excellent advantages that the generation of lapping scratches on the surface to be lapped can be prevented to the utmost, the peeling of the lapping layer from the lapping tape can be suppressed and the lapping tape has excellent lapping ability.

5 Claims, 1 Drawing Sheet

LAPPING TAPE

BACKGROUND OF THE INVENTION

1. Field of the Invention

The present invention relates to a lapping tape used for lapping of the surface of a magnetic head, magnetic disk or the like.

2. Description of the Related Art

A lapping tape which has a lapping layer formed on a flexible substrate is used for the precision finish processing of a magnetic head or surface finish processing of a magnetic recording medium. The lapping layer is formed by coating a paint for the formation of a lapping layer onto a flexible substrate, followed by drying. The paint for the formation of a lapping layer contains, in the kneaded or dispersed form, inorganic powders such as aluminum oxide, chromium oxide, silicon carbide, iron oxide, silicon nitride or diamond; an organic binder such as polyvinyl chloride resin, polyester resin or polyurethane resin; and other components.

As a process for producing a lapping tape, there is a conventionally known process described in Japanese Patent Application Laid-Open No. HEI 5-192869, wherein a lapping tape is produced using a paint comprising an epoxy resin which has repeated units of a specific structural formula and has an average molecular weight of 1000 to 10000, a polyurethane resin which has a number-average molecular weight of 5000 to 20000 and has an OH group at its terminal, and a polyfunctional isocyanate. It is said that according to the above process, a sufficient crosslinking rate and also a high crosslink density can be obtained by using the above resins in combination even if the crosslinking temperature is lowered to room temperature.

Disclosed in Japanese Patent Application Laid-Open No. HEI 5-192870 is a process of producing a lapping tape which comprises using an epoxy resin which contains recurring units of a specific structural formula and has an average molecular weight of 1000 to 50000, a polyester resin which has a number-average molecular weight of 1000 to 30000, has an OH group at its terminal and has a glass transition point (Tg) of –20 to 40° C., and a polyfunctional isocyanate. It is reported that the non uniformity of the qualities which occurs during the hardening reaction can be reduced by using the above resins in combination.

It is however difficult to say that the lapping tape obtained according to each of the above proposals has a sufficient coating layer strength. There happens to occur inconvenience that the coating layer as a lapping layer peels during the lapping test.

The present invention has been made in view of the foregoing situations. An object of the present invention is to provide a lapping tape which functions sufficiently with a good balance as a lapping tape upon lapping the surface of a magnetic head, magnetic disc or the like, more specifically, a lapping tape which can prevent the generation of scratches on the surface to be lapped to the utmost, has a sufficient coating layer strength, has a peeling-resistant lapping layer and has excellent lapping ability.

SUMMARY OF THE INVENTION

With a view toward overcoming the above-described problems, the present inventors have carried out an extensive investigation on the composition of a binder used for a lapping tape. As a result, it has been found that the above problems can be overcome by the use of a binder containing a mixture of a phenoxy resin and a polyester polyurethane resin having a specific molecular weight, leading to the completion of the present invention.

In one aspect of the present invention, there is thus provided a lapping tape having, on a flexible substrate, a lapping layer comprising inorganic powders and a binder as main components, said binder comprising:

1) a phenoxy resin; and 2) a polyester polyurethane resin having a number-average molecular weight Mn not less than 20000 but not greater than 100000.

In another aspect of the present invention, there is also provided a lapping tape wherein the phenoxy resin has a number-average molecular weight greater than 10000.

In a further aspect of the present invention, there is also provided a lapping tape wherein the phenoxy resin has a number-average molecular weight greater 10000 but not greater than 30000.

In a still further aspect of the present invention, there is also provided a lapping tape wherein the phenoxy resin and the polyester polyurethane resin are mixed at a weight ratio ranging from 5:95 to 70:30.

In a still further aspect of the present invention, there is also provided a lapping layer wherein the polyester polyurethane resin has a glass transition point Tg of from –50° C. to 80° C.

In a still further aspect of the present invention, there is also provided a lapping layer wherein the inorganic powders have a Mohs hardness not less than 5 and a particle size of 0.1 to 20 $\mu$m.

In a still further aspect of the present invention, there is also provided the use of the lapping tape according to the present invention for lapping of a magnetic head or magnetic disk.

DETAILED DESCRIPTION OF THE PREFERRED EMBODIMENTS

Figure 1:
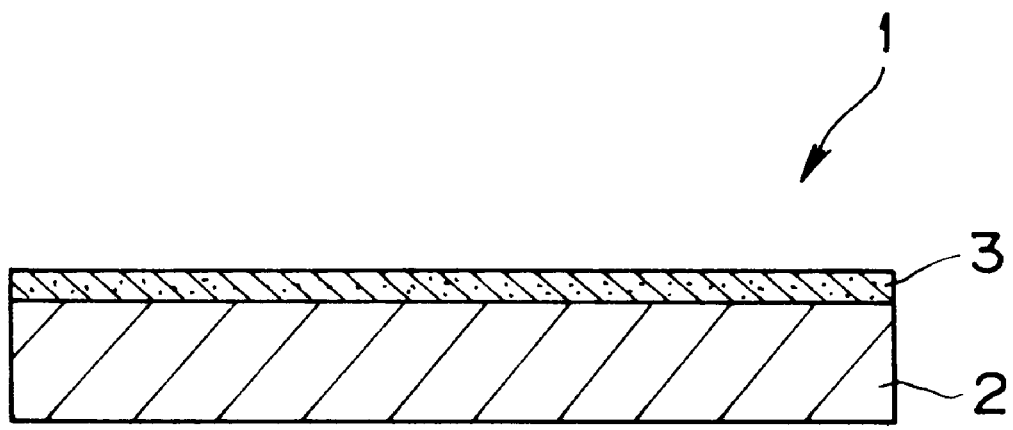
FIG. 1 is a schematic cross-sectional view of the lapping tape according to the present invention.

The preferred embodiment of the present invention will hereinafter be described with reference to FIG. 1.

FIG. 1 is a schematic cross-sectional view illustrating the embodiment of the lapping tape according to the present invention.

The lapping tape 1 according to the present invention has, on a flexible substrate 2, a lapping layer 3 for the lapping (cleaning) of the surface of a magnetic head or magnetic disc (which will hereinafter be called "the surface to be lapped", simply). This lapping layer 3 contains inorganic powders as an abrasive material and a binder for binding these inorganic powders.

The lapping layer 3 of the present invention is formed by coating, on the flexible substrate 2, a paint for the formation of a lapping layer obtained by mixing and dispersing the above-described inorganic powders, binder and various additives, which are used as needed, together with an (organic) solvent, followed by drying.

The binder used in the present invention contains as essential components a phenoxy resin and a polyester polyurethane resin having a number-average molecular weight Mn not less than 20000 but not greater than 100000.

The phenoxy resin used in the present invention is a high-molecular-weight polyhydroxypolyether synthesized from bisphenol A and epichlorohydrin and has a chemical structure similar to an epoxy resin. It has, however, a by far larger molecular weight compared with the ordinarily employed epoxy resin. As the phenoxy resin, those having a number-average molecular weight Mn greater than 10000, particularly, greater than 10000 but not greater than 30000 are preferred in the present invention. When the number-average molecular weight is not greater than 10000 like the ordinarily used epoxy resin, a sufficient coating layer strength cannot be attained and problems such as peeling off of the film from the lapping layer sometimes happen. The term "average molecular weight" as used herein means the value as measured by the standard polystyrene method.

The phenoxy resin is added in an amount of 5 to 70 wt. %, preferably 10 to 60 wt. %, more preferably 10 to 50 wt. % based on the total amount of the binder. Amounts less than 5 wt. % lower the film strength of the lapping layer, leading to the problems such as peeling of the coating layer from the lapping layer. When the amount is greater than 70 wt. %, on the other hand, the film of the lapping layer becomes hard, fragile and stiff, which becomes a cause for scratches on the surface to be lapped.

Specific examples of the phenoxy resin usable in the present invention include "PKHC", "PKHH" and "PKHJ", each phenoxy resin of Phenoxy Associates Inc. Each of these resins satisfy the above-described preferred range of the number-average molecular weight.

In the present invention, the binder for the lapping layer contains as an essential component a polyester polyurethane resin having a number-average molecular weight Mn not less than 20000 but not greater than 100000, preferably not less than 20000 but not greater than 80000. The incorporation of a polyester polyurethane resin having such a number-average molecular weight Mn makes it possible to improve the dispersibility of the paint for the formation of a lapping layer and to impart the resulting lapping layer with excellent lapping properties.

The number-average molecular weights Mn of the polyester polyurethane resin less than 20000 lower the film strength of the lapping layer, leading to troubles such as peeling of the film from the lapping layer. The number-average molecular weights Mn exceeding 100000, on the other hand, lower the dispersibility of the paint for the formation of a lapping layer, leading to a deterioration in the surface condition of the lapping layer. As a result, such a condition becomes a cause for scratches on the surface to be lapped upon lapping operation.

The content of such a polyester polyurethane resin in the binder is 30 to 95 wt. %, preferably 40 to 90 wt. %, more preferably 50 to 90 wt. %. When the content of the polyester polyurethane resin exceeds 95 wt. %, the film strength of the lapping layer lowers and troubles such as peeling of the film from the lapping layer tend to occur. When the content is less than 30 wt. %, on the other hand, the film of the lapping layer becomes hard, fragile and stiff, which becomes a cause for scratches on the surface to be lapped upon lapping operation.

In addition, the polyester polyurethane resin has a glass transition point Tg satisfying the following equation:

$$-50° C. \leq Tg \leq +80° C.,$$

preferably $$-50° C. \leq Tg \leq +40° C.,$$

more preferably $$-45° C. \leq Tg \leq +20° C.$$

When the glass transition point becomes lower than the above lowest limit, the film strength of the lapping layer decreases, which tends to lead to a deterioration in the lapping ability. When the glass transition point becomes higher than the above upper limit, the film of the lapping layer becomes hard, fragile and stiff and the film under such conditions becomes a cause for scratches on the surface to be lapped upon lapping operation.

Incidentally, the glass transition point Tg of the above resin is a value as measured by a kinetic viscoelasticity measuring apparatus.

The polyester polyurethane resin used in the present invention is obtained by reacting a polyester diol with an isocyanate and optionally a compound such as a chain extender.

Described specifically, the polyester polyurethane resin used in the present invention is obtained by reacting (A) an organic diisocyanate, (B) a polyester diol having a molecular weight of 500 to 5000 and (C) a chain extender having a molecular weight less than 500.

Examples of the organic diisocyanate (A) usable in the preparation of the polyester polyurethane resin include 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-dimethyl-4, 4'-biphenylene diisocyanate, 4,4'-diphenylene diisocyanate, 4,4'-diisocyanate diphenyl ether, 1,5-naphthalene diisocyanate, p-xylylene diisocyanate, m-xylylene diisocyanate, 1,3-diisocyanate methylcyclohexane, 1,4-diisocyanate methylcyclohexane, 4,4'-diisocyanate cyclohexane, 4,4'-diisocyanate cyclohexylmethane and isophorone diisocyanate.

As the polyester diol (B) used in the preparation of the polyester polyurethane resin, those having a molecular weight within a range of 500 to 5000 can be given as examples. Examples of the carboxylic acid component of the polyester diol include aromatic dicarboxylic acids such as terephthalic acid, isophthalic acid, orthophthalic acid and 1,5-naphthalic acid; aromatic oxycarboxylic acids such as p-oxybenzoic acid and p-(hydroxyethoxy)benzoic acid; and aliphatic dicarboxylic acids such as succinic acid, adipic acid, azelaic acid, sebacic acid and dodecane dicarboxylic acid. Among them, terephthalic acid, isophthalic acid, orthophthalic acid, adipic acid and sebacic acid are preferred.

Examples of the glycol component in the polyester diol include ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, cyclohexane dimethanol, ethylene-oxide adduct or propylene-oxide adduct of bisphenol A, and ethylene-oxide adduct or propylene-oxide adduct of hydrogenated bisphenol A.

In addition, lactone-base polyester diols available by the ring-opening polymerization of a lactone such as ε-caprolactone can be given as the other polyester diols.

It is recommended to use, as the long-chain diol (B), a polyester diol having a molecular weight of 500 to 5000 in order to heighten the mechanical properties of the polyester polyurethane resin. Molecular weights less than 500 increase the concentration of a urethane group, thereby causing inconvenience such as deterioration in the flexibility of the resin or solubility of the solvent. Molecular weights exceeding 5000, on the other hand, decrease the concentration of a urethane group, leading to a deterioration in the toughness or abrasion resistance peculiar to the polyester polyurethane resin.

The chain extender (C), which is used upon preparation of the polyester polyurethane resin and has a molecular weight less than 500, contains at least two active hydrogens in one molecule and has effects for adjusting the concentration of a urethane or urea group in the polyester polyurethane resin, thereby imparting the polyester polyurethane resin with toughness peculiar to it.

Specific examples of the compound as the chain extender (C) include linear glycols such as ethylene glycol, 1,3-propylene glycol, 1,4-butanediol, 1,6-hexanediol, cyclohexane dimethanol, xylylene glycol, diethylene glycol, triethylene glycol and ethylene-oxide adduct of bisphenol A; branched glycols such as propylene glycol, neopentyl glycol, 1,2-butanediol, 1,3-butanediol, 2,2,4-trimethyl-1,3-pentanediol and propylene-oxide adduct of bisphenol A; amino alcohols such as monoethanolamine and N-methylethanolamine; diamines such as ethylenediamine, hexamethylenediamine and isophoronediamine; and water.

As the polyester polyurethane resin, a reaction product of a polyester diol (1), another polyester diol (2), neopentyl glycol and 4,4'-diphenylmethane diisocyanate is preferred in the present invention. The polyester diol (1) is a 50:50:50:50 (molar ratio) composition of terephthalic acid, isophthalic acid, ethylene glycol and neopentyl glycol, while another polyester diol (2) is a 100:75:25 (molar ratio) composition of adipic acid, 1,4-butanediol and neopentyl glycol.

The glass transition point Tg of the polyester polyurethane resin can be adjusted freely by controlling the mixing ratio of the polyester diol (1) with the polyester diol (2) and the concentration of a urethane group.

The content of the binder in the lapping layer (paint for the formation of the lapping layer) is 5 to 50 parts by weight based on 100 parts by weight of the inorganic powders contained in the lapping layer, with 10 to 40 parts by weight being particularly preferred. Contents of the binder less than 5 parts by weight lower the film strength of the lapping layer, thereby causing peeling of the film from the lapping layer. Contents exceeding 50 parts by weight, on the other hand, relatively lower the content of the inorganic powders, resulting in a deterioration in the lapping properties.

As a cross-linking agent for curing the binder, various polyisocyanates, particularly, diisocyanate can be used. Particularly preferred is at least one of tolylene diisocyanate, hexamethylene diisocyanate and methylene diisocyanate. It is particularly preferred to use the above-exemplified crosslinking agents as a crosslinking agent, such as trimethylol propane, which has been modified to have a plurality of hydroxyl groups or as an isocyanulate type crosslinking agent which has three diisocyanate molecules bound each other. Such a crosslinking agent links the resin, binding with a functional group or the like contained in the above binder. The crosslinking agent is preferably contained in an amount of 10 to 30 parts by weight based on 100 parts by weight of the binder. For curing of the thermosetting resin, it is only necessary to heat the resin at 40 to 80° C. for 12 to 48 hours in a heating oven.

As the inorganic powders contained as an essential component in the paint (lapping layer) for the formation of a lapping layer, those having a Mohs hardness not lower than 5 are preferred. Fine powders such as silicon carbide, aluminum oxide, silicon nitride, zirconium oxide, chromium oxide, diamond and emery are used either singly or in combination. Among them, silicon carbide and aluminum oxide are particularly suited.

The inorganic powders have preferably a particle size falling within a range of about 0.1 to 20 μm. It is only necessary to select a proper particle size so as to satisfy the using purpose, for example, rough lapping or finish lapping. When the particle size is less than 0.1 μm, the lapping ability tends to become insufficient even upon use for finish lapping. When the particle size exceeds 20 μm, on the other hand, inconvenience such as scratching the surface is apt to occur even upon use for rough lapping.

To the lapping layer of the present invention, additives having lubricating effects, antistatic effects, dispersing effects, plasticization effects and the like are added. Specific examples include fatty acids, fatty acid esters, silicone oils, fluorine oil, various surfactants and carbon black.

Examples of the organic solvent used for the paint for the formation of a lapping layer include ketones such as methyl ethyl ketone, methyl isobutyl ketone and cyclohexanone; aromatic hydrocarbons such as toluene and xylene; and esters such as ethyl acetate and butyl acetate. These solvents may be used either as a single solvent or a solvent mixture of a desired ratio. Among them, it is suited to incorporate cyclohexanone, which is a high-boiling-point solvent, in the paint in order to form a good-quality lapping layer. Cyclohexanone is used in an amount of 20 to 60 wt. % based on the whole organic solvent, with 25 to 50 wt. % being preferred. Amounts within this range make it possible to impart the lapping layer with good surface properties, thereby improving lapping ability and preventing its peeling.

Such a paint for the formation of a lapping layer has preferably a solid concentration of 30 to 70 wt. %, more preferably 40 to 60 wt. %. Solid concentrations less than 30 wt. % increase the amount of the solvent remaining in the lapping layer, leading to the inconvenience that a uniform film cannot be obtained owing to the Benard cell phenomenon. Solid concentrations exceeding 70 wt. %, on the other hand, cause an increase in the viscosity of the paint and drying rate of the coating layer of the lapping layer, resulting in the inconvenience that a uniform coating layer cannot be obtained.

Although the film thickness of the lapping layer 3 is determined as needed according to the shape or quality of the material to be lapped, it is preferably 3 to 25 μm, with 5 to 20 μm being more preferred. When the film thickness is less than 3 μm, the lapping layer loses its elasticity because of its thinness and the surface is apt to be scratched upon lapping operation. When the film thickness exceeds 25 μm, on the other hand, the lapping layer tends to peel off upon lapping operation. The lapping layer 3 may be formed as a single coating layer or multiple coating layers.

As the flexible substrate 2, polyethylene terephthalate (PET), polyethylene naphthalate (PEN), polyamide, polyimide and polyamideimide films can be used in the present invention. It is possible to add as a filler an inorganic compound such as oxide or carbonate of Al, Ca, Si or Ti, or organic compound such as acrylic resin fine powders as needed. Among the above films, PET, PEN and aromatic polyamide films are preferred, with complex films obtained by multilayer co-extrusion of two or three kinds of PET and/or PEN films being more preferred. Such a flexible substrate may be subjected to corona discharge treatment, plasma discharge and/or polymerization treatment, easy-adhesive coating treatment, dust-removal treatment or relaxation treatment by heat and/or moisture-conditioning in advance. The flexible substrate 2 is generally formed to have a thickness of 5 to 100 μm.

Upon the preparation of the paint for the formation of a lapping layer in the present invention, it is preferred to use a ball mill, attritor or sand mill as a dispersing machine. It is preferred to filter the paint after dispersion. When inorganic powders which have not been dispersed or have agglutinated or insoluble matters of the resin remain in the paint, they will become a cause for scratches on the surface to be lapped. Incidentally, the filtration is conducted for the purpose of removing the foreign matters from the paint for the formation of the lapping layer.

Upon production of a lapping tape, the paint, which has been filtered through a filter having a fixed filtration accuracy while or after being mixed with a hardener as needed, is coated onto a non-magnetic substrate which is in the form of a long-continuous-length film drawn from an unwound roll. It is applied by various known coating means such as gravure coating, reverse roll coating or extrusion nozzle coating.

Prior to the coating of the paint, the flexible substrate 2 is generally treated, for the purpose of cleaning or surface control, by various known means such as wet cleaning with water or solvent, dry cleaning with nonwoven cloth or extra-fine fiber cloth as a wiper, or non-contact type cleaning with pressed air, vacuum or ionized air. Sometimes, for improving the adhesion between the paint and flexible substrate or improving the surface to be coated, various known non-contact type surface treatments such as corona discharge, ultraviolet radiation or electron beam radiation are given to the flexible substrate.

The paint coated on the flexible substrate 2 is dried by the known drying and evaporating means generally disposed inside of the drying furnace such as hot air drier, far infrared radiation drier, electric heater or vacuum apparatus. The drying temperature may range from 40 to 200° C., preferably 60 to 180° C. and more preferably 80 to 150° C. It may be determined as needed according to the heat resistance of the flexible substrate, the kind of the solvent or solid concentration. Drying temperatures less than 40° C. lower the drying efficiency and increase the residual amount of the solvent. Drying temperatures exceeding 200° C., on the other hand, cause drastic evaporation of the solvent from the paint, leading to a deterioration of the surface roughness of the lapping layer. The drying furnace may have a temperature gradient. In the drying furnace, air, inert gas or the like is generally used as a gas atmosphere.

After drying, it is possible to subject the lapping layer 3 to thermosetting treatment at 40 to 80° C. and/or electron beam radiation treatment in order to promote the hardening of the lapping layer.

By cutting into a predetermined shape and secondary processing, the lapping tape of the present invention is produced.

The present invention will next be described more specifically by specific examples. It should however be borne in mind that the present invention is not limited to or by the following examples.

EXPERIMENT EXAMPLE 1

First, a polyester polyurethane resin was prepared according to the following procedure.

Preparation of a Polyester Polyurethane Resin

In a reaction vessel equipped with a thermometer, stirrer and partial reflux condenser, dimethyl terephthlate, dimethyl isophthalate, ethylene glycol, neopentyl glycol, zinc acetate and sodium acetate were charged, followed by ester exchange reaction at 140 to 220° C. for 3 hours.

The pressure of the reaction system was then reduced to 5 mmHg over 20 minutes, while the temperature was increased to 250° C. By the polycondensation reaction at 0.1 mmHg and 250° C. for 60 minutes, a polyester diol (1) was obtained. It was found to be a 50:50:50:50 (molar ratio) composition of terephthalic acid, isophthalic acid, ethylene glycol and neopentyl glycol.

Similarly, another polyester diol (2) was obtained. It was found to be a 100:75:25 (molar ratio) composition of adipic acid, 1,4-butanediol and neopentyl glycol.

In a reaction vessel equipped with a thermometer, stirrer and a reflux condenser, toluene, methyl isobutyl ketone, the above polyesterdiol (1), the above polyesterdiol (2), 4,4'-diphenylmethane diisocyanate, neopentyl glycol and dibutyltin dilaurate were charged, followed by the reaction at 70 to 90° C. for 8 hours. Various polyester polyurethane resins having an average molecular weight (Mn) and a glass transition point (Tg) as shown in Table 1 were prepared.

Then, the paint for the formation of a lapping layer was prepared according to the following procedure.

Paint for the Formation of a Lapping Layer (1) Preparation of a binder solution

| | |
|---|---|
| · Phenoxy resin ("PKHH", trade name; product of Phenoxy Associates Inc., number-average molecular weight: 15000) | 20 parts by weight |
| · Polyester polyurethane resin (having a number-average molecular weight Mn and a glass transition point Tg as shown in Table 1) | 80 parts by weight |
| · MEK (methyl ethyl ketone) | 130 parts by weight |
| · Toluene | 130 parts by weight |
| · Cyclohexanone | 140 parts by weight |

The above components were charged in a hypermixer, followed by mixing and stirring for 6 hours, whereby a binder solution was obtained. The binder solution so obtained was subjected to circulating filtration through a depth filter having a 95% cut filtration accuracy of 15.0 μm for 8 hours.

(2) Dispersing treatment

| | |
|---|---|
| · Inorganic powders (aluminum oxide, "WA#4000" trade name; product of Fujimi Incorporated) | 500 parts by weight |
| · Binder solution (above-described one) | 500 parts by weight |

The above components were charged in an attritor and dispersed for three hours.

(3) Viscosity adjustment

After the completion of the dispersing treatment, the below-described solvents were charged, followed by further one hour dispersion.

| | |
|---|---|
| · MEK (methyl ethyl ketone) | 70 parts by weight |
| · Toluene | 70 parts by weight |
| · Cyclohexanone | 80 parts by weight |

After the viscosity adjustment, the paint for the formation of a lapping layer was subjected to circulating filtration through a depth filter having a 95% cut filtration accuracy of 25.0 μm for 8 hours (4) Final paint To 1220 parts by weight of the paint after filtration, 20 parts by weight of an isocyanate compound ("Colonate L", trade name; product of Nippon Polyurethane Kogyo) were added, followed by stirring and mixing, whereby a final paint for the formation of a lapping layer was prepared.

Production of a Lapping Tape

The paint obtained above was coated onto one side of a flexible substrate composed of a 75-μm thick polyethylene terephthalate film, followed by drying. The film thickness of the lapping layer was 15 μm after drying. The substrate with the lapping layer wound in a form of roll, cured in a heating oven of 60° C. for 24 hours, followed by cutting into a ¾-inch width, whereby a lapping tape sample was produced.

Various lapping tape samples as shown below in Table 1 were produced and properties such as relative lapping ability, scratches of the head made by lapping and peeling from the lapping tape were evaluated.

Relative lapping ability

A ferrite head was lapped with each of the lapping tape samples and a time spent for the lapping of 1 μm of the ferrite head was measured. With the lapping time of Sample No. 1, which was used as a standard, as 100, the lapping time of the other samples were indicated relatively. Described specifically, the lapping ability was expressed by a relative value, with the lapping ability of the standard Sample No. 1 as 100. When the value is smaller than 100, the lapping ability is better.

Lapping scratches on the head

Conditions of the scratches formed on the surface of a ferrite head by the lapping with a lapping tape sample were observed by the optical microscope and evaluation was made in accordance with the following standards for judgment.

⊚: Having no scratches

○: Acceptable as a product but having one or two scratches

Δ: Acceptable as a product but having three to five scratches.

X: Not acceptable as a product because having at least six scratches.

Peeling from the lapping tape

When a ferrite head was lapped with a lapping tape sample, the presence or absence of peeling of the lapping layer from the lapping tape was observed by the optical microscope. The lapping tape was evaluated in accordance with the following standards.

○: No peeling

Δ: Acceptable as a product in spite of small peelings.

X: Not acceptable as a product because of having large peelings.

The above measuring results are shown below in Table 1.

TABLE 1

| Sample No. | Polyester polyurethane Mn | Polyester polyurethane Tg (° C.) | Phenoxy/polyester polyurethane (weight ratio) | Relative lapping ability | Lapping scratches on the head | Peeling of lapping tape |
|---|---|---|---|---|---|---|
| 1 | 49000 | −30 | 20/80 | 100 | ⊚ | ○ |
| 2 | 25000 | −30 | 20/80 | 99 | ⊚ | ○ |

TABLE 1-continued

| Sample No. | Polyester polyurethane Mn | Polyester polyurethane Tg (° C.) | Phenoxy/polyester polyurethane (weight ratio) | Relative lapping ability | Lapping scratches on the head | Peeling of lapping tape |
|---|---|---|---|---|---|---|
| 3 | 70000 | −30 | 20/80 | 101 | ⊚ | ○ |
| 4 | 90000 | −30 | 20/80 | 105 | ○ | ○ |
| 5 (comparison) | 10000 | −30 | 20/80 | 140 | ⊚ | X |
| 6 (Comparison) | 150000 | −30 | 20/80 | 120 | X | ○ |
| 7 | 49000 | −45 | 20/80 | 110 | ⊚ | ○ |
| 8 | 49000 | 20 | 20/80 | 98 | ⊚ | ○ |
| 9 | 49000 | 40 | 20/80 | 95 | ○ | ○ |
| 10 | 49000 | 70 | 20/80 | 88 | Δ | ○ |
| 11 | 49000 | −30 | 5/95 | 110 | ⊚ | Δ |
| 12 | 49000 | −30 | 10/90 | 106 | ⊚ | ○ |
| 13 | 49000 | −30 | 40/60 | 97 | ⊚ | ○ |
| 14 | 49000 | −30 | 50/50 | 90 | ⊚ | ○ |
| 15 | 49000 | −30 | 60/40 | 88 | ○ | ○ |
| 16 | 49000 | −30 | 70/30 | 80 | Δ | ○ |
| 17 (Comparison) | 49000 | −30 | 20/80 | 120 | ⊚ | X |

Sample No. 17: An epoxy resin (Mn = 6000) was used instead of the phenoxy resin of Sample No. 1.

EXPERIMENT EXAMPLE 2

Using the lapping tape samples Nos. 1, 5 and 6 of Experiment Example 1, a flexible magnetic disk prepared in advance were lapped and scratches on the surface of the disk and the peeling of the lapping layer from the lapping tape were evaluated. The results are shown below in Table 2.

Lapping scratches on the magnetic disk

The conditions of the scratches formed on the surface of the magnetic disk upon lapping of a flexible magnetic disk with a lapping tape sample were observed by the optical microscope. The lapping tape was evaluated in accordance with the following judging standards.

○: No scratches were found.

X: Not acceptable as a product because scratches appeared.

Peeling from the lapping tape

The presence or absence of the peeling of the lapping layer from the lapping tape, at the time when a flexible magnetic disc was lapped with a lapping tape sample, was observed by the optical microscope. The lapping tape was evaluated according to the following standards.

○: No peeling was found.

X: Not acceptable as a product because peeling appeared. The measuring results are shown below in Table 2.

TABLE 2

| Sample No. | Lapping scratches on the disk surface | Peeling of the lapping tape |
|---|---|---|
| 1 | ○ | ○ |
| 5 (Comparison) | ○ | X |
| 6 (Comparison) | X | ○ |

The advantages of the present invention are apparent from above results. Described specifically, the lapping tape of the present invention has, on a flexible substrate, a lapping layer composed mainly of inorganic powders and a binder, said binder comprising:

1) a phenoxy resin; and 2) a polyester polyurethane resin having a number-average molecular weight Mn of 20000 to 100000. The lapping tape according to the present invention has made it possible to suppress the generation of lapping scratches on the surface to be lapped, to decrease the peeling of the lapping layer from the lapping tape and have excellent lapping ability.

What is claimed is:

1. A lapping tape having, on a flexible substrate, a lapping layer comprising inorganic powders and a binder as main components, said binder comprising:

1) a phenoxy resin; and 2) a polyester polyurethane resin having a number-average molecular weight Mn not less than 20,000 but not greater than 100,000, wherein the phenoxy resin has a number-average molecular weight greater than 10,000.

2. A lapping tape according to claim 1, wherein the phenoxy resin has a number-average molecular weight greater than 10,000 but not greater than 30,000.

3. A lapping tape according to claim 1, wherein the phenoxy resin and the polyester polyurethane resin are mixed at a weight ratio ranging from 5:95 to 70:30.

4. A lapping tape according to claim 1, wherein the polyester polyurethane resin has a glass transition point Tg from −50° C. to 80° C.

5. A lapping tape according to claim 1, wherein inorganic powders have a Mohs hardness not less than 5 and a particle size of 0.1 to 20 μm.

* * * * *